US012789924B2

(12) United States Patent
Yokoyama et al.

(10) Patent No.: US 12,789,924 B2
(45) Date of Patent: Nov. 10, 2026

(54) AIRFLOW DEFLECTOR

(71) Applicant: KABUSHIKI KAISHA TOKAI-RIKA-DENKI-SEISAKUSHO, Aichi-ken (JP)

(72) Inventors: Kazuyuki Yokoyama, Aichi (JP); Masahide Inayama, Aichi (JP); Daisuke Nakayama, Aichi (JP); Nobuhiro Kudo, Aichi (JP); Toshiya Ito, Aichi (JP); Kazunori Tanaka, Aichi (JP)

(73) Assignee: KABUSHIKI KAISHA TOKAI-RIKA-DENKI-SEISAKUSHO, Aichi-ken (JP)

( * ) Notice: Subject to any disclaimer, the term of this patent is extended or adjusted under 35 U.S.C. 154(b) by 189 days.

(21) Appl. No.: 18/630,636

(22) Filed: Apr. 9, 2024

(65) Prior Publication Data

US 2024/0343323 A1 Oct. 17, 2024

(30) Foreign Application Priority Data

Apr. 14, 2023 (JP) ................................ 2023-066671

(51) Int. Cl.
*B62D 35/02* (2006.01)

(52) U.S. Cl.
CPC .................................. *B62D 35/02* (2013.01)

(58) Field of Classification Search
CPC .............. B60R 16/005; B60R 16/0232; B60R 16/027; B62D 35/005; B62D 35/02; B62D 35/007; B62D 35/008; B62D 37/02
USPC ...................................................... 296/180.1
See application file for complete search history.

(56) References Cited

U.S. PATENT DOCUMENTS

| | | | | |
|---|---|---|---|---|
| 10,081,400 | B2 * | 9/2018 | Abdoul Azizou | B62D 35/02 |
| 10,370,042 | B2 * | 8/2019 | Bray | B62D 35/02 |
| 10,981,611 | B2 * | 4/2021 | Matthews | B62D 35/005 |
| 12,187,356 | B2 * | 1/2025 | Mizuno | B62D 35/02 |
| 12,420,727 | B2 * | 9/2025 | Hu | H02P 3/025 |
| 2004/0112053 | A1 | 6/2004 | Yamada et al. | |
| 2015/0375809 | A1 * | 12/2015 | Yuasa | B62D 37/02 296/180.1 |

(Continued)

FOREIGN PATENT DOCUMENTS

| | | | | |
|---|---|---|---|---|
| FR | 3071471 | A1 * | 3/2019 | B62D 37/02 |
| FR | 3103166 | A1 * | 5/2021 | B62D 37/02 |
| JP | 2021512004 | A | 5/2021 | |

OTHER PUBLICATIONS

Office Action received in corresponding Application No. JP 202306671, dated Aug. 21, 2026, 2 pages.

*Primary Examiner* — Wenwei Zhuo
(74) *Attorney, Agent, or Firm* — Dority & Manning, PA

(57) ABSTRACT

An airflow deflector has: an airflow deflecting body supported at a vehicle body of a vehicle so as to be able to rotate between an extended position at a lower side of the vehicle body of the vehicle and a retracted position at the vehicle body side; a driving section generating driving force for rotating the airflow deflecting body; a detecting device detecting a rotational position of the airflow deflecting body irrespective of operation of the driving section; and a rotational position recognizing section that, when judging that the rotational position detected by the detecting device has not changed throughout a threshold time period, judges that the airflow deflecting body has stopped rotating.

5 Claims, 15 Drawing Sheets

(56) References Cited

U.S. PATENT DOCUMENTS

| | | | | |
|---|---|---|---|---|
| 2017/0088194 | A1* | 3/2017 | Heil | B62D 35/00 |
| 2017/0088197 | A1* | 3/2017 | Heil | B62D 35/005 |
| 2017/0299006 | A1* | 10/2017 | Shi | F16D 65/847 |
| 2019/0106163 | A1* | 4/2019 | Fahland | B62D 37/02 |
| 2019/0322323 | A1* | 10/2019 | Andre | B62D 35/005 |
| 2019/0344837 | A1 | 11/2019 | Toki et al. | |
| 2020/0062108 | A1* | 2/2020 | Brand | B60R 16/03 |
| 2020/0094889 | A1* | 3/2020 | Shiga | B62D 35/005 |
| 2020/0160625 | A1* | 5/2020 | Dudar | G07C 5/0808 |
| 2020/0172058 | A1* | 6/2020 | Demetrio | F16D 65/847 |
| 2021/0061087 | A1 | 3/2021 | Brand et al. | |
| 2021/0129661 | A1* | 5/2021 | Uozumi | B60S 1/68 |
| 2021/0139087 | A1 | 5/2021 | Promutico | |
| 2022/0348073 | A1 | 11/2022 | Brand et al. | |
| 2023/0065474 | A1* | 3/2023 | Umino | B62D 37/02 |
| 2023/0143257 | A1* | 5/2023 | Yokoyama | B62D 37/02 296/180.1 |
| 2023/0202585 | A1* | 6/2023 | Nakayama | B62D 35/005 296/180.1 |
| 2023/0242192 | A1* | 8/2023 | Yokoyama | B62D 35/005 296/180.5 |
| 2023/0286599 | A1* | 9/2023 | Matsumoto | B62D 35/005 |
| 2024/0051625 | A1* | 2/2024 | Nakayama | B62D 37/02 |
| 2024/0308601 | A1* | 9/2024 | Matsumoto | B62D 35/005 |
| 2026/0008505 | A1* | 1/2026 | Aird | B62D 35/005 |

* cited by examiner

AIRFLOW DEFLECTOR

CROSS-REFERENCE TO RELATED APPLICATION

This application is based on and claims priority under 35 USC 119 from Japanese Patent Application No. 2023-066671 filed on Apr. 14, 2023, the disclosure of which is incorporated by reference herein.

BACKGROUND

Technical Field

The present disclosure relates to an airflow deflector that suppresses airflow toward the front wheels of a vehicle.

Related Art

The airflow deflector disclosed in Japanese Patent Application National Publication (JP-A) No. 2021-512004 has an airflow deflecting body (an air guiding flap) that is rotated between a first outer side position and a second outer side position by the driving force of an electric motor (driving section) of a driving unit. Moreover, the airflow deflector can detect that the airflow deflecting body is at the first outer side position or the second outer side position, on the basis of the current supplied to the electric motor.

In such an airflow deflector, it is preferable to be able to detect the rotational position and the stopped position of the airflow deflecting body, no matter what position the airflow deflecting body is at. Moreover, in such an airflow deflector, it is preferable to be able to detect the rotational position and the stopped position of the airflow deflecting body even in cases in which the driving section has broken down.

In view of the above-described circumstances, an object of the present disclosure is to provide an airflow deflector that can detect the rotational position and the stopped position of an airflow deflecting body, no matter what position the airflow deflecting body is at and regardless of the absence/presence of trouble with a driving section.

SUMMARY

An airflow deflector of a first aspect of the present disclosure includes: an airflow deflecting body that is supported at a vehicle body of a vehicle so as to be rotatable between an extended position at a lower side of the vehicle body of the vehicle and a retracted position at a vehicle body side; a driving section that generates driving force for rotating the airflow deflecting body; a detecting device that detects a rotational position of the airflow deflecting body irrespective of operation of the driving section; and a rotational position recognizing section that, in a case of judging that the rotational position detected by the detecting device has not changed throughout a threshold time period, judges that the airflow deflecting body has stopped rotating.

In an airflow deflector of a second aspect of the present disclosure, in the airflow deflector of the first aspect of the present disclosure, based on a detection value of the detecting device, the rotational position recognizing section judges that a situation is normal in a case of judging that the airflow deflecting body has stopped rotating in a first predetermined range that includes the extended position or in a case of judging that the airflow deflecting body has stopped rotating in a second predetermined range that includes the retracted position, and based on the detection value of the detecting device, the rotational position recognizing section judges that a situation is abnormal in a case of judging that the airflow deflecting body has stopped rotating at a position that is different from the first predetermined range and the second predetermined range.

In an airflow deflector of a third aspect of the present disclosure, the airflow deflector of the first aspect or the second aspect of the present disclosure includes: a first stopper mechanism that mechanically restricts rotation of the airflow deflecting body from the extended position in an extending direction that is a direction at a side opposite the retracted position; and a second stopper mechanism that mechanically restricts rotation of the airflow deflecting body from the retracted position in a retracting direction that is a direction at a side opposite the extended position.

In an airflow deflector of a fourth aspect of the present disclosure, the airflow deflector of any one of the first aspect through the third aspect of the present disclosure includes: a driving section control section that controls the driving section; and a worm, and a worm wheel that is meshed with the worm, which transmit driving force generated by the driving section to the airflow deflecting body, wherein the driving section control section controls the driving section to generate driving force for rotating the airflow deflecting body in the extending direction throughout the threshold time period after the first stopper mechanism restricts rotation of the airflow deflecting body in the extending direction, and wherein the driving section control section controls the driving section to generate driving force for rotating the airflow deflecting body in the retracting direction throughout the threshold time period after the second stopper mechanism restricts rotation of the airflow deflecting body in the retracting direction.

In an airflow deflector of a fifth aspect of the present disclosure, the airflow deflector of any one of the first aspect through the fourth aspect of the present disclosure includes a rotation shaft that is a center of rotation of the airflow deflecting body, wherein the detecting device includes: a detected portion, and a detecting portion that detects a position of the detected portion, and wherein one of the detected portion or the detecting portion is provided at the rotation shaft, coaxially with the rotation shaft.

In the airflow deflector of the first aspect of the present disclosure, the airflow deflecting body rotates between the extended position at the lower side of the vehicle body and the retracted position at the vehicle body side, by the driving force generated by the driving section. Moreover, the detecting device detects the rotational position of the airflow deflecting body. If the rotational position detected by the detecting device does not change throughout the threshold time period, the rotational position recognizing section judges that the airflow deflecting body has stopped rotating.

Moreover, the detecting device of the airflow deflector of the first aspect detects the rotational position of the airflow deflecting body, irrespective of operation of the driving section. Therefore, the airflow deflector of the first aspect can detect the rotational position and the stopped position of the airflow deflecting body, no matter what position the airflow deflecting body is at and regardless of the absence/presence of trouble with the driving section.

In the airflow deflector of the second aspect of the present disclosure, the rotational position recognizing section judges that the situation is normal in a case of judging that the airflow deflecting body has stopped rotating in the first predetermined range or in a case of judging that the airflow deflecting body has stopped rotating in the second predetermined range, based on the detection value of the detecting device. Moreover, the rotational position recognizing section judges that the situation is abnormal in a case of judging, on the basis of the detection value of the detecting device, that the airflow deflecting body has stopped rotating at a position that is different than the first predetermined range and the second predetermined range. Therefore, by using the one detecting device, the airflow deflector of the second aspect can carry out a judgment as to whether or not the airflow deflecting body is stopped, and a judgment as to whether or not the position at which rotation of the airflow deflecting body is stopped is included in the first predetermined range or the second predetermined range.

In the airflow deflector of the third aspect of the present disclosure, the first stopper mechanism mechanically restricts rotation of the airflow deflecting body from the extended position in the extending direction that is the direction at the side opposite the retracted position. Further, the second stopper mechanism mechanically restricts rotation of the airflow deflecting body from the retracted position in the retracting direction that is the direction at the side opposite the extended position. Therefore, the airflow deflector of the third aspect can reliably prevent rotation of the airflow deflecting body in the extending direction from the extended position, and rotation of the airflow deflecting body in the retracting direction from the retracted position.

In the airflow deflector of the fourth aspect of the present disclosure, the worm and the worm wheel transmit the driving force generated by the driving section to the airflow deflecting body. Further, the driving section generates driving force for rotating the airflow deflecting body in the extending direction throughout the threshold time period after the first stopper mechanism restricts rotation of the airflow deflecting body in the extending direction. Moreover, the driving section generates driving force for rotating the airflow deflecting body in the retracting direction throughout the threshold time period after the second stopper mechanism restricts rotation of the airflow deflecting body in the retracting direction. Therefore, the airflow deflector of the fourth aspect can self-lock the airflow deflecting body at the extended position and at the retracted position.

The airflow deflector of the fifth aspect of the present disclosure can detect the rotational position of the airflow deflecting body with high accuracy, as compared with a case in which one of the detected portion and the detecting portion is provided at the airflow deflecting body.

BRIEF DESCRIPTION OF THE DRAWINGS

Exemplary embodiments of the present disclosure will be described in detail based on the following figures, wherein.

DETAILED DESCRIPTION

Figure 1:
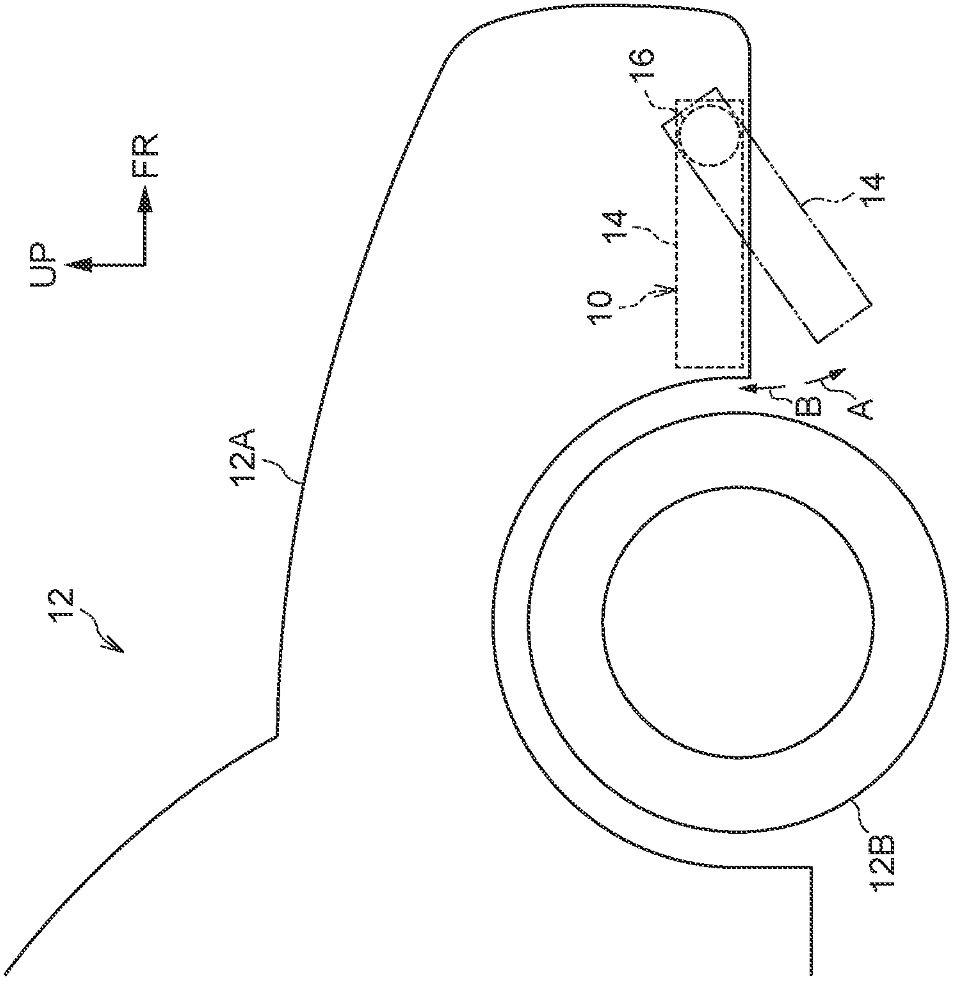
FIG. 1 is a side view seen from a vehicle transverse direction outer side and illustrating the front portion of a vehicle in a first embodiment of the present disclosure.
Figure 2:
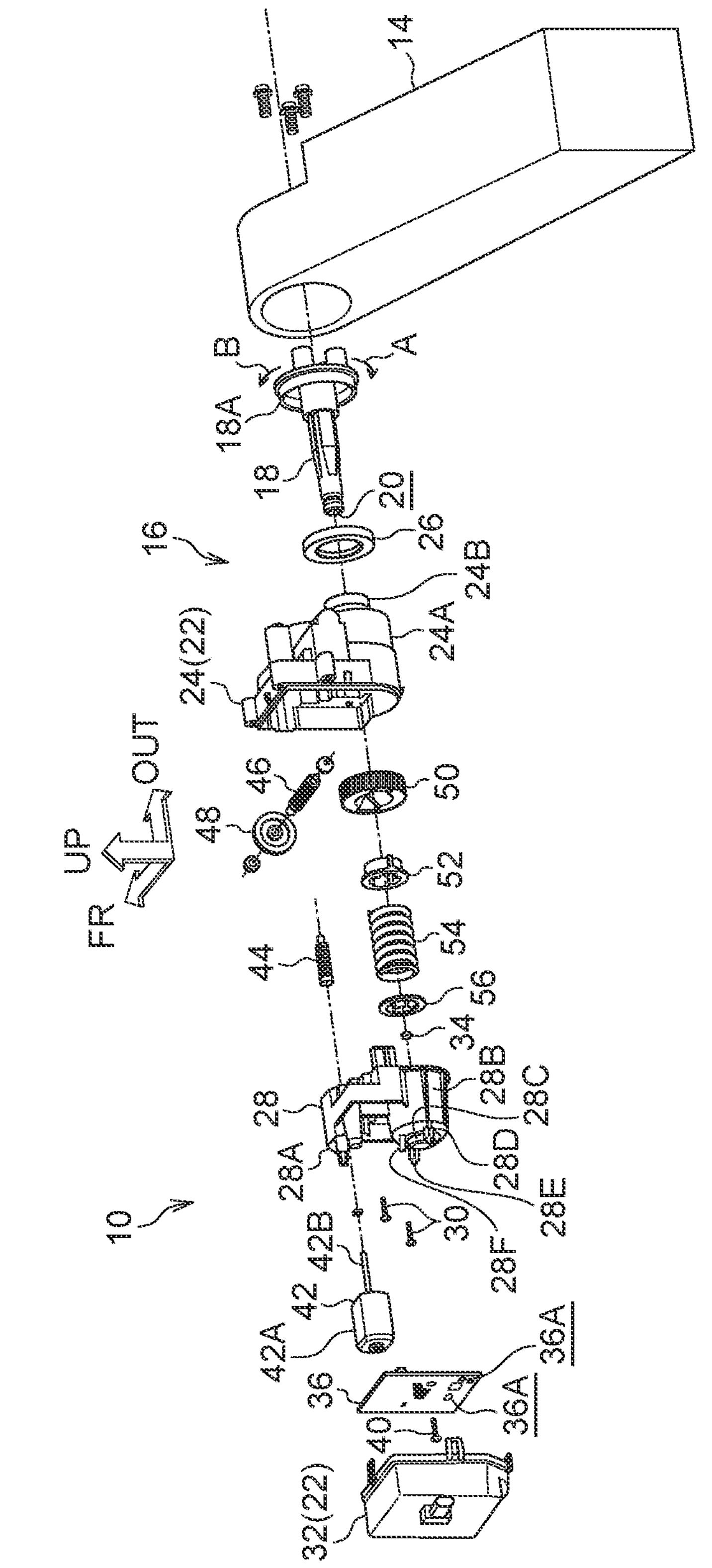
FIG. 2 is an exploded perspective view seen from the vehicle rear side and a vehicle transverse direction inner side and illustrating an airflow deflector relating to the first embodiment of the present disclosure.
Figure 3:
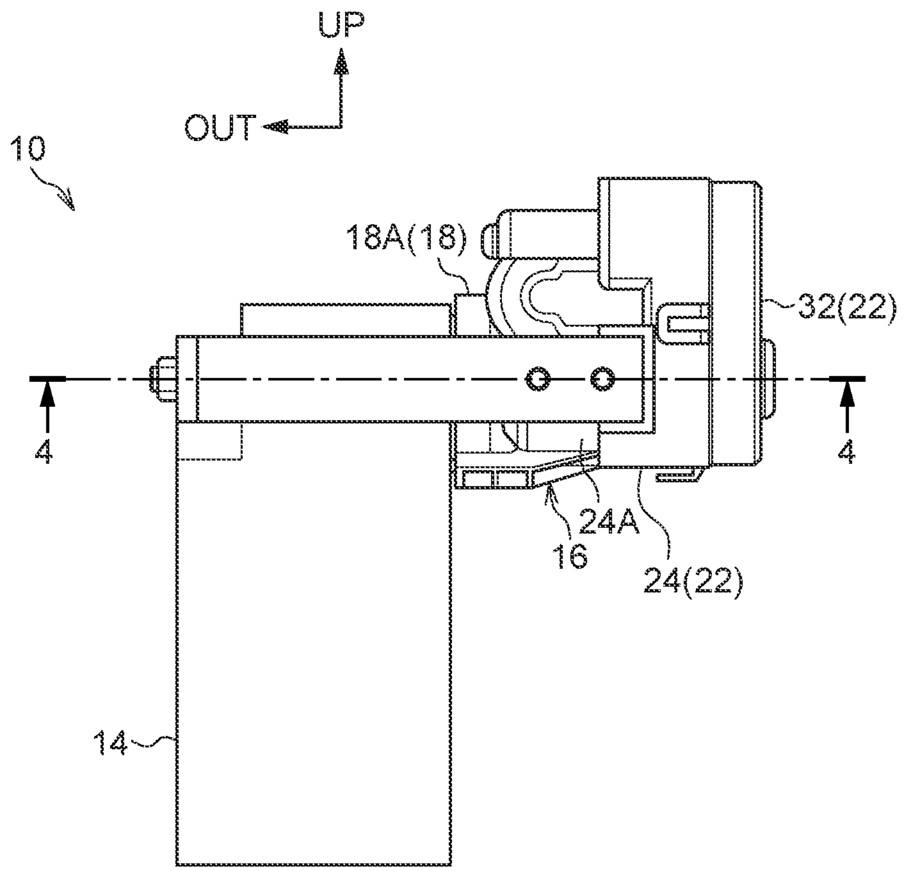
FIG. 3 is a front view seen from the vehicle front side and illustrating the airflow deflector relating to the first embodiment of the present disclosure.
Figure 4:
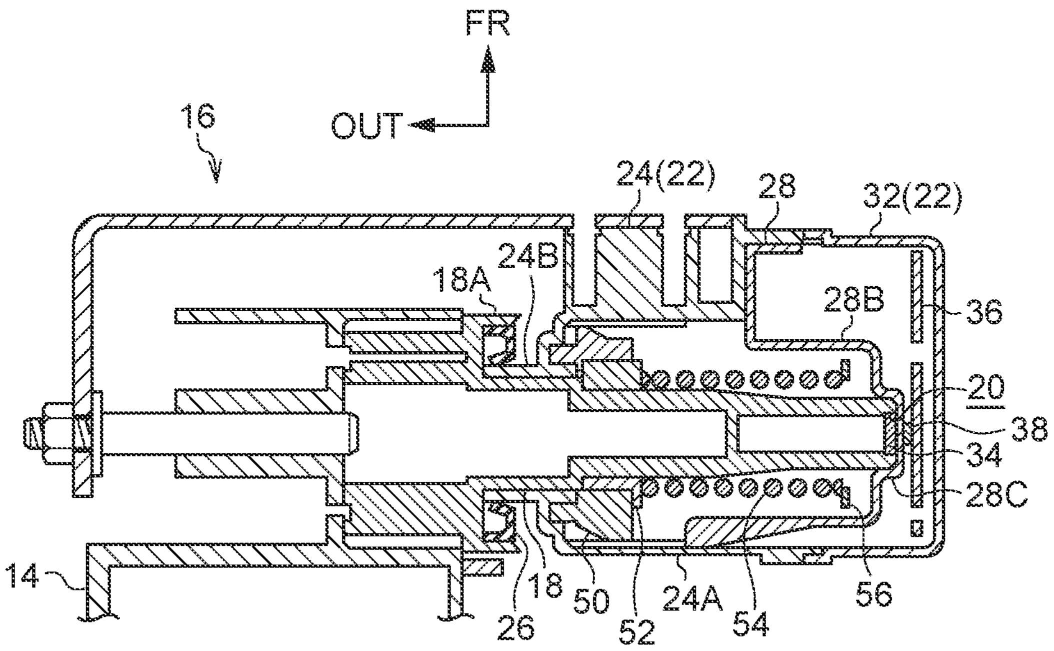
FIG. 4 is a cross-sectional view seen from the lower side (a cross-sectional view along line 4-4 of FIG. 3) and illustrating the airflow deflector relating to the first embodiment of the present disclosure.

The front portion of vehicle 12 in a first embodiment is illustrated in FIG. 1 in a side view seen from a vehicle transverse direction outer side (the vehicle right side). An airflow deflector 10 relating to the first embodiment is illustrated in FIG. 2 in an exploded perspective view seen from the vehicle rear side and the vehicle transverse direction inner side. Moreover, the airflow deflector 10 is illustrated in FIG. 3 in a front view seen from the vehicle front side, and is illustrated in FIG. 4 in a cross-sectional view seen from the lower side (a cross-sectional view along line 4-4 of FIG. 3). Note that, in the drawings, the vehicle front side is denoted by arrow FR, the vehicle transverse direction outer sides are denoted by arrow OUT, and the upper side is denoted by arrow UP.

As illustrated in FIG. 1, a left and right pair of the airflow deflectors 10 relating to the first embodiment are disposed within the front end portion of a vehicle body 12A, and are disposed at the front sides of left and right front wheels 12B of the vehicle 12. The airflow deflector 10 has an airflow deflecting body 14, a driving device 16 and an ECU 60 that are described hereinafter.

As illustrated in FIG. 1 through FIG. 4, the airflow deflecting body 14, which is made of resin and substantially shaped as a rectangular parallelopiped box, is provided at the airflow deflector 10.

The driving device 16 is assembled to the vehicle transverse direction inner side of the airflow deflecting body 14, and is fixed to the interior of the front end portion of the vehicle body 12A.

A stand (rotation shaft) 18, which is substantially shaped as a cylindrical tube, is formed of resin and serves as a rotation member, is provided at the driving device 16. The axial direction of the stand 18 is the vehicle transverse direction. The vehicle transverse direction outer side end portion of the stand 18 is joined to the vehicle front side end portion of the airflow deflecting body 14. With the stand 18 being the central axis, the airflow deflecting body 14 can rotate in extending direction A that is the direction of the lower side of the vehicle body 12A, and retracting direction B that is the direction of the vehicle body 12A side (refer to FIG. 1 and FIG. 2). Namely, the airflow deflecting body 14 can rotate between a retracted position (the position illustrated by the dashed line in FIG. 1), and an extended position (the position illustrated by the two-dot chain line in FIG. 1). When the airflow deflecting body 14 is at the retracted position, the airflow deflecting body 14 does not face, in the vehicle longitudinal direction, the corresponding front wheel 12B. When the airflow deflecting body 14 is at the extended position, the airflow deflecting body 14 faces, in the vehicle longitudinal direction, the corresponding front wheel 12B.

A sealing tube 18A, which is annular and serves as a sealing portion, is formed integrally and coaxially at a vicinity of the vehicle transverse direction outer side end portion of the stand 18. The sealing tube 18A is L-shaped in cross-section, and a bottom wall and a side wall are provided thereat. The bottom wall of the sealing tube 18A is shaped as an annular disk and is integral with the stand 18. The side wall of the sealing tube 18A is shaped as a cylindrical tube, and projects-out from the radial direction outer side end portion of the bottom wall of the sealing tube 18A toward the vehicle transverse direction inner side.

Figure 9:
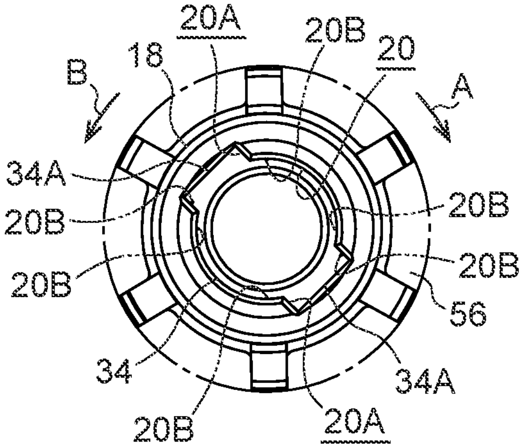
FIG. 9 is a side view seen from a vehicle transverse direction inner side and illustrating a stand and the like of the airflow deflector relating to the first embodiment of the present disclosure.

A fixing hole 20 (see FIG. 9) that is circular is formed coaxially within the vehicle transverse direction inner side end portion of the stand 18. The diameter of the fixing hole 20 is formed to be slightly larger than the diameter of the portion of the stand 18 interior, which portion is further toward the vehicle transverse direction outer side than the fixing hole 20, and the fixing hole 20 opens toward the vehicle transverse direction inner side. A predetermined number (two in the first embodiment) of restricting holes 20A that are rectangular and serve as restricting portions are formed at the radial direction outer side of the fixing hole 20. The respective restricting holes 20A communicate with the fixing hole 20, and are disposed at a uniform interval in the peripheral direction of the fixing hole 20. The restricting holes 20A open toward the vehicle transverse direction inner side. The bottom surfaces (vehicle transverse direction outer side surfaces) of the restricting holes 20A are continuous with the bottom surface (the vehicle transverse direction outer side surface) of the fixing hole 20.

A predetermined number (four in the first embodiment) of crush ribs 20B, which are shaped as triangular pillars and serve as press-fit portions, are formed integrally with the peripheral surface of the fixing hole 20. The crush ribs 20B extend in the axial direction of the fixing hole 20. The predetermined number of crush ribs 20B are disposed at a uniform interval in the peripheral direction of the fixing hole 20. The restricting holes 20A are disposed at central positions, in the peripheral direction of the fixing hole 20, between the crush ribs 20B. Moreover, the crush ribs 20B that are similar are formed integrally also at the retracting direction B side surfaces of the restricting holes 20A (or may be formed at the extending direction A side surfaces thereof).

A case 24, which is box-shaped, is made of resin, serves as a supporting member and structures an accommodating body 22, is provided at the vehicle transverse direction inner side of the stand 18. The interior of the case 24 opens toward the vehicle transverse direction inner side. An accommodating tube 24A, which is substantially shaped as a cylindrical tube having a bottom, is formed at the lower side portion of the case 24. The axial direction of the accommodating tube 24A is the vehicle transverse direction, and the interior of the accommodating tube 24A communicates with the upper side portion of the interior of the case 24. A supporting tube 24B, which is shaped as a cylindrical tube and serves as a first supporting portion, is formed coaxially and integrally with the bottom wall (the vehicle transverse direction outer side wall) of the accommodating tube 24A. The supporting tube 24B passes-through the bottom wall of the accommodating tube 24A, and the interior opens toward the vehicle transverse direction outer side.

The stand 18 fits-together coaxially with the interior of the supporting tube 24B. Due thereto, the supporting tube 24B rotatably supports the stand 18, and the stand 18 is coaxially inserted into the accommodating tube 24A. The bottom wall of the sealing tube 18A of the stand 18 is near the supporting tube 24B at the vehicle transverse direction outer side thereof. Moreover, a sealing ring 26 that is annular and serves as a sealing member is inserted between the supporting tube 24B and the sealing tube 18A. The sealing ring 26 is made of rubber and has a sealing ability. The sealing ring 26 elastically deforms by being nipped between the supporting tube 24B and the side wall of the sealing tube 18A. The sealing ring 26 seals between the case 24 and the stand 18, and limits infiltration of water into the case 24.

Figure 10:
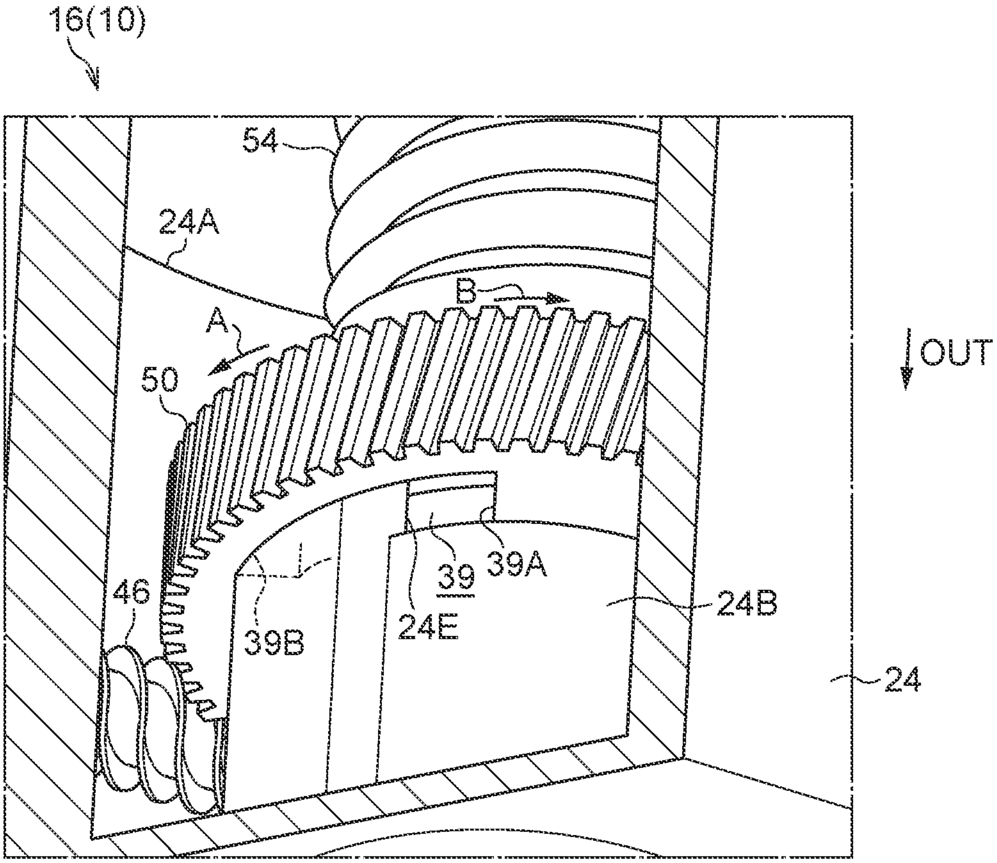
FIG. 10 is a perspective view seen from a vehicle transverse direction outer side and illustrating the driving device of the airflow deflector relating to the first embodiment of the present disclosure.

As illustrated in FIG. 10, a predetermined number (two in the first embodiment) of restricting plates 24E, which are substantially shaped as rectangular plates and serve as restricting portions, are formed integrally with the outer periphery of the supporting tube 24B. The predetermined number of restricting plates 24E are disposed at a uniform interval in the peripheral direction of the accommodating tube 24A, and are respectively curved along the peripheral direction of the accommodating tube 24A. The restricting plates 24E extend in the axial direction of the supporting tube 24B (the vehicle transverse direction). The restricting plates 24E are formed integrally with the bottom wall of the accommodating tube 24A, and project-out toward the vehicle transverse direction inner side of the supporting tube 24B.

Figure 8A:
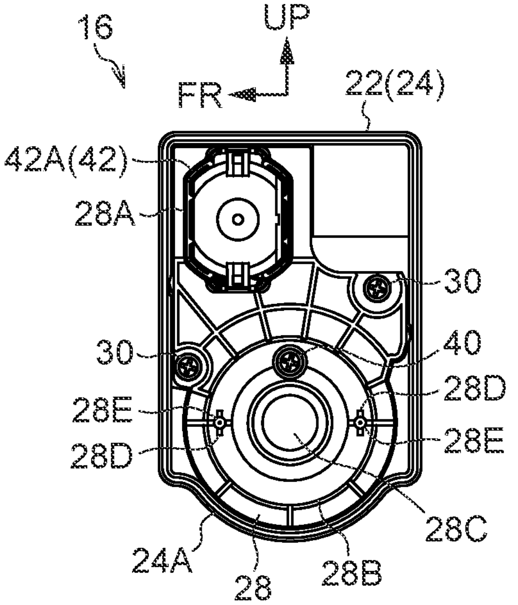
FIG. 8(A) and FIG. 8(B) are side views seen from the vehicle transverse direction inner side and illustrating the driving device of the airflow deflector relating to the first embodiment of the present disclosure, where (A) illustrates a region within a case that is further toward the vehicle transverse direction inner side than a motor base, and (B) illustrates a region within the case that is further toward the vehicle transverse direction outer side than the motor base.

A motor base 28 (refer to FIG. 8A), which is made of resin and serves as a partitioning member, is accommodated within the case 24. The outer periphery of the motor base 28 is fit together with the inner periphery of the case 24. A pair of fixing screws 30 are passed-through the vertical direction intermediate portion of the motor base 28. The fixing screws 30 are screwed-together with the bottom wall (the vehicle transverse direction outer side wall) of the case 24, and the motor base 28 is fixed (fastened) to the case 24.

A holding tube 28A, which is substantially shaped as an oval tube having a bottom and serves as a holding portion, is formed integrally with the upper side portion of the motor base 28. The holding tube 28A projects-out toward the vehicle transverse direction inner side, and the interior thereof opens toward the vehicle transverse direction inner side.

An insertion tube 28B, which is substantially shaped as a cylindrical tube having a bottom and serves as an insertion portion, is formed integrally at the lower side portion of the motor base 28. The insertion tube 28B projects-out toward the vehicle transverse direction inner side, and the interior thereof opens toward the vehicle transverse direction outer side. The insertion tube 28B is disposed coaxially with the accommodating tube 24A of the case 24. The stand 18 is inserted coaxially into the insertion tube 28B. A fit-together tube 28C, which is substantially shaped as a cylindrical tube having a bottom and serves as a second supporting portion (fit-together portion), is formed coaxially and integrally with the bottom wall (the vehicle transverse direction inner side wall) of the insertion tube 28B. The fit-together tube 28C projects-out toward the vehicle transverse direction inner side from the bottom wall of the insertion tube 28B. The interior of the fit-together tube 28C opens onto the interior of the insertion tube 28B. The vehicle transverse direction inner side end portion of the stand 18 is coaxially fit-together with the interior of the fit-together tube 28C, and the fit-together tube 28C rotatably supports the stand 18.

Figure 5A:
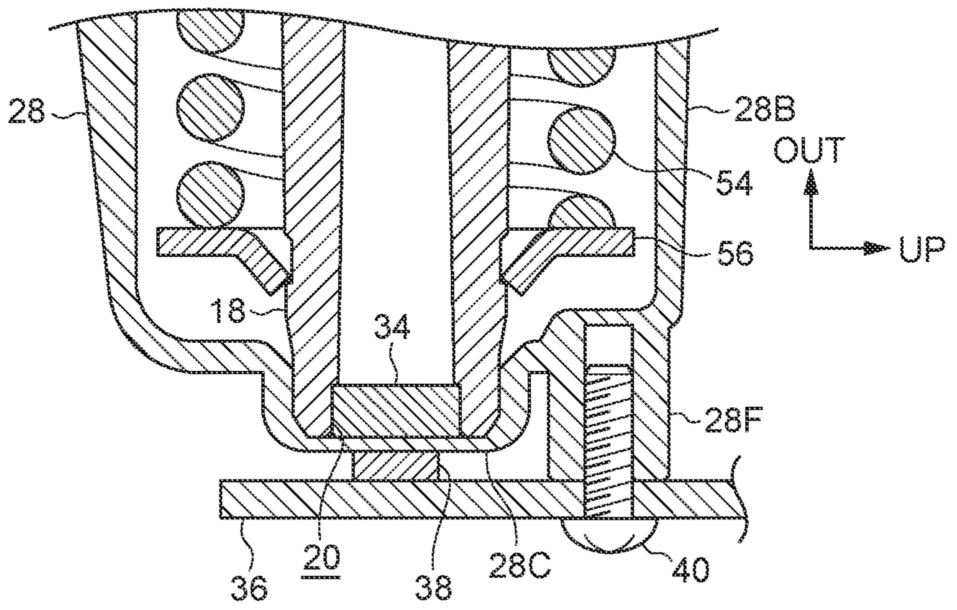
FIG. 5A and FIG. 5B are drawings illustrating main portions of the airflow deflector relating to the first embodiment of the present disclosure, where 5A is a cross-sectional view seen from the vehicle front side, and 5B is a broken perspective view seen from the vehicle front side and a vehicle transverse direction outer side.

A pair of placement pillars 28D, which are shaped as cross-shaped pillars in cross-section and serve as positioning portions, are formed integrally with the bottom wall of the insertion tube 28B. The pair of placement pillars 28D respectively project-out toward the vehicle transverse direction inner side, and are disposed at a uniform interval in the peripheral direction of the insertion tube 28B. Placement pins 28E, which are shaped as solid cylinders and serve as positioning regions, are formed integrally and coaxially at the vehicle transverse direction inner sides of the placement pillars 28D. The placement pins 28E project-out toward the vehicle transverse direction inner side. A placement tube 28F (refer to FIG. 5A), which is shaped as a cylindrical tube and serves as a positioning portion, is formed integrally with the bottom wall of the insertion tube 28B at a central position, in the peripheral direction of the insertion tube 28B, between the placement pillars 28D. The placement tube 28F projects-out toward the vehicle transverse direction inner side.

A cover 32, which is box-shaped, made of resin, serves as a covering member and structures the accommodating body 22, is provided at the vehicle transverse direction inner side of the case 24 and the motor base 28. The interior of the cover 32 opens toward the vehicle transverse direction outer side. The vehicle transverse direction inner side end portion of the case 24 is fit together with and fixed to the interior of the vehicle transverse direction outer side end portion of the cover 32. The cover 32 covers and seals the vehicle transverse direction inner sides of the case 24 and the motor base 28. Further, the interior of the accommodating body 22 (the case 24 and the cover 32) is partitioned by the motor base 28 into a vehicle transverse direction outer side (one side) and a vehicle transverse direction inner side (another side).

The accommodating body 22 is fixed to the interior of the front end portion of the vehicle body 12A, and the airflow deflector 10 is thereby set at the interior of the front end portion of the vehicle body 12A.

Figure 5B:
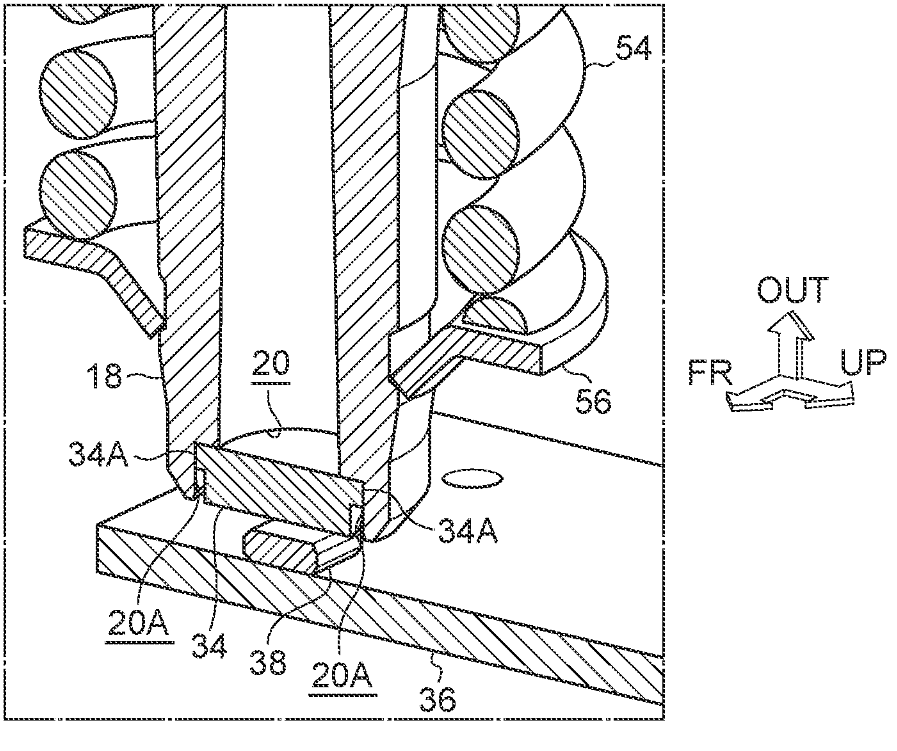

A magnet (detecting device) (detected portion) 34 (refer to FIG. 5A, FIG. 5B and FIG. 9), which is shaped as a solid cylinder and serves as a detected portion, is fit-together coaxially with the fixing hole 20 of the stand 18. The magnet 34 is press-fit (fixed) in the fixing hole 20 due to the crush ribs 20B of the fixing hole 20 being crushed. At the time when the motor base 28 is fixed to the case 24, the magnet 34 is made to abut (planarly contact) the bottom wall (vehicle transverse direction inner side wall) of the fit-together tube 28C of the motor base 28, and is press-fit into the fixing hole 20, and the magnet 34 is not made to abut the bottom surface of the fixing hole 20. Due thereto, the magnet 34 is positioned in the axial direction (the vehicle transverse direction) by the bottom wall of the fit-together tube 28C, and is positioned in the radial direction by the fixing hole 20.

A predetermined number (two in the first embodiment) of restricted pillars 34A, which are substantially shaped as rectangular pillars and serve as restricted portions, are formed integrally with the peripheral surface of the magnet 34. The predetermined number of restricted pillars 34A are disposed at a uniform interval in the peripheral direction of the magnet 34, and the respective vehicle transverse direction outer side surfaces thereof are flush with the vehicle transverse direction outer side surface of the magnet 34. The restricted pillars 34A are fit-together with the restricting holes 20A of the stand 18, and rotation of the magnet 34 with respect to the stand 18 is thereby restricted. At the time when the magnet 34 is press-fit into the fixing hole 20, due to the crush ribs 20B of the restricting holes 20A being crushed, the restricted pillars 34A are press-fit into the restricting holes 20A, and the restricted pillars 34A are not made to abut the bottom surfaces of the restricting holes 20A.

A circuit board 36 that is substantially shaped as a rectangular plate is accommodated within the cover 32 so as to be orthogonal to the vehicle transverse direction. A magnetic sensor (detecting device) (detecting portion) 38 (a magnetic resistance element), which is substantially shaped as a rectangular plate and serves as a detecting portion, is fixed to the lower portion of the vehicle transverse direction outer side surface of the circuit board 36. The magnetic sensor 38 faces the magnet 34 in the vehicle transverse direction via the bottom wall of the fit-together tube 28C of the motor base 28, and is disposed parallel to and coaxial with the magnet 34. Therefore, the magnetic sensor 38 can detect the direction of the magnetic field generated by the magnet 34. Further, the magnetic sensor 38 is slightly apart from or abuts (planarly contacts) the bottom wall of the fit-together tube 28C.

Figure 6:
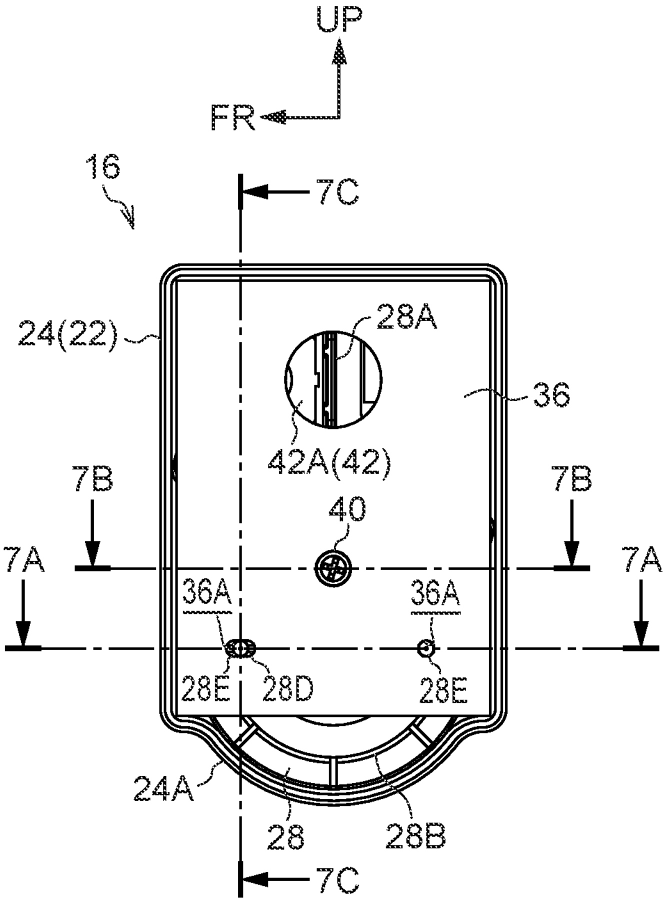
FIG. 6 is a side view seen from the vehicle transverse direction inner side and illustrating a driving device of the airflow deflector relating to the first embodiment of the present disclosure.
Figure 7A:
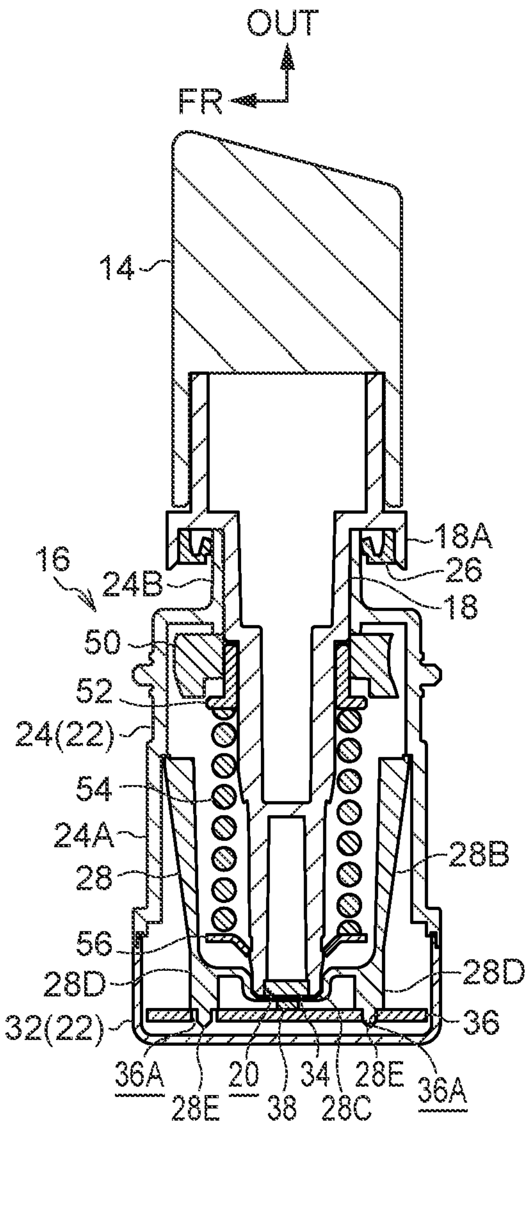
FIG. 7A through FIG. 7C are drawings illustrating the airflow deflector relating to the first embodiment of the present disclosure, where 7A is a cross-sectional view seen from the upper side (a cross-sectional view along line 7A-7A of FIG. 6), 7B is a cross-sectional view seen from the upper side (a cross-sectional view along line 7B-7B of FIG. 6), and 7C is a cross-sectional view seen from the vehicle rear side (a cross-sectional view along line 7C-7C of FIG. 6)
Figure 7B:
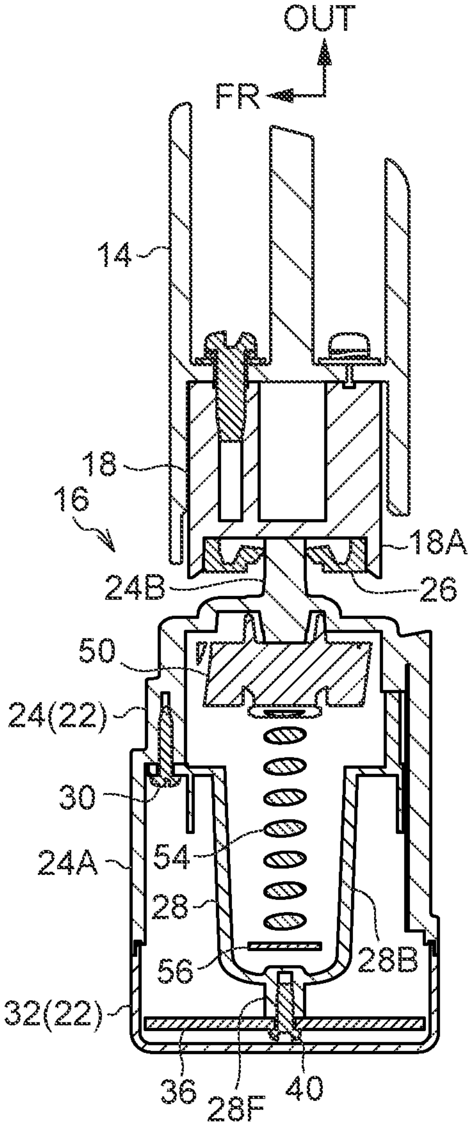
Figure 7C:
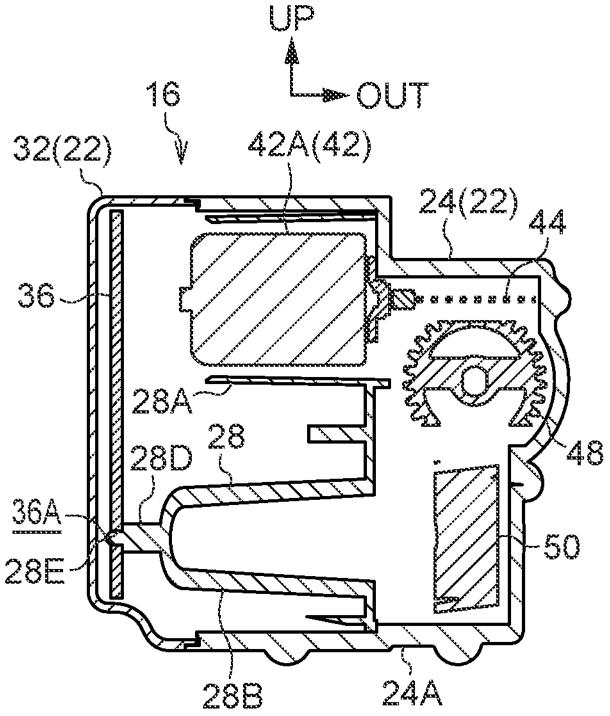

A pair of placement holes 36A (refer to FIG. 6, FIG. 7A and FIG. 7C) serving as positioned portions are formed so as to pass through the circuit board 36 at the periphery of the magnetic sensor 38. The pair of placement holes 36A are disposed at a uniform interval in the peripheral direction of the magnet 34. The one (rear) placement hole 36A is circular, and one of the placement pins 28E of the motor base 28 is fit together with the one placement hole 36A. The another (front) placement hole 36A is substantially shaped as an elongated rectangle, and the another of the placement pins 28E of the motor base 28 is fit together with the another placement hole 36A. Due thereto, the circuit board 36 and the magnetic sensor 38 are positioned in the vehicle longitudinal direction, the vertical direction and the peripheral direction of the one placement hole 36A.

A placement screw 40 (see FIG. 5A, FIG. 6 and FIG. 7B) passes-through the circuit board 36. The circuit board 36 is fixed (fastened) to the placement tube 28F due to the placement screw 40 being screwed-together with a female screw groove formed in the inner peripheral surface of the placement tube 28F of the motor base 28. The circuit board 36 is made to abut (planarly contact) the distal end surfaces (the vehicle transverse direction inner side surfaces) of the placement pillars 28D of the motor base 28 and the distal end surface (the vehicle transverse direction inner side surface) of the placement tube 28F. The circuit board 36 and the magnetic sensor 38 are thereby positioned in the vehicle transverse direction.

A motor (driving section) 42 (refer to FIG. 7C and FIG. 8A) that serves as a driving mechanism is provided at the upper side portion of the interior of the accommodating body 22. A main body portion 42A that is substantially shaped as an oval pillar is provided at the motor 42. The main body portion 42A is fit into and held in the holding tube 28A of the motor base 28 from the vehicle transverse direction inner side. An output shaft 42B extends-out toward the vehicle transverse direction outer side from the main body portion 42A. The output shaft 42B passes-through the motor base 28 and extends-out to the vehicle transverse direction outer side of the motor base 28.

A first-stage worm (driving section) 44 made of resin is provided at the vehicle transverse direction outer side of the motor 42. The vehicle transverse direction outer side end portion of the first-stage worm 44 is supported so as to rotate freely at the bottom wall of the case 24. The output shaft 42B of the motor 42 is coaxially inserted in the first-stage worm 44 from the vehicle transverse direction inner side. When the output shaft 42B rotates, the first-stage worm 44 rotates integrally with the output shaft 42B.

Figure 8B:
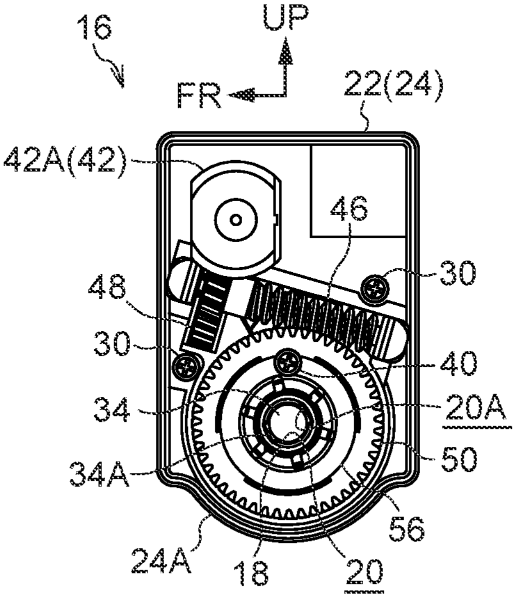

An output worm (driving section) 46 (refer to FIG. 8B) made of metal is provided at the lower side of the first-stage worm 44. The output worm 46 is supported so as to rotate freely between the bottom wall of the case 24 and the motor base 28. A first-stage gear (driving section) 48 (worm wheel) made of resin is coaxially supported at the vehicle front side of the output worm 46. The first-stage gear 48 is rotated integrally with the output worm 46. The first-stage gear 48 meshes together with the first-stage worm 44. Due to the first-stage worm 44 being rotated, the first-stage gear 48 and the output worm 46 are rotated integrally.

An output gear 50 (worm wheel, refer to FIG. 8B), which is substantially shaped as a cylindrical tube, is made of metal and serves as a driving member, is provided at the lower side of the output worm 46. The stand 18 coaxially fits together with the interior of the output gear 50, and the output gear 50 is rotatably supported at the stand 18. The output gear 50 can move in the vehicle transverse direction (the axial direction) with respect to the stand 18, and the output gear 50 is made to abut the supporting tube 24B of the case 24 from the vehicle transverse direction inner side. The output gear 50 is meshed together with the output worm 46, and rotation of the output gear 50 is restricted. When the output worm 46 rotates, the output gear 50 rotates.

As illustrated in FIG. 10, a predetermined number (two in the first embodiment) of restricted grooves 39, which are substantially shaped as elongated rectangles and serve as restricted portions, are formed at the output gear 50. The predetermined number of restricted grooves 39 are disposed at a uniform interval in the peripheral direction of the output gear 50. The restricted grooves 39 are curved along the peripheral direction of the output gear 50, and open toward the vehicle transverse direction outer side. The surfaces, at the retracting direction B sides, of the restricted grooves 39 are extension restricting surfaces 39A serving as first restricted portions, and the extension restricting surfaces 39A are orthogonal to the peripheral direction of the output gear 50. The surfaces, at the extending direction A sides, of the restricted grooves 39 are retraction restricting surfaces 39B serving as second restricted portions, and the retraction restricting surfaces 39B are orthogonal to the peripheral direction of the output gear 50. The restricting plates 24E of the case 24 are inserted in the restricted grooves 39 from the vehicle transverse direction outer side. When the airflow deflecting body 14 is positioned at the extended position, the restricting plates 24E contact the extension restricting surfaces 39A. Due thereto, further rotation of the airflow deflecting body 14 in the extending direction A from the extended position is prevented. Further, when the airflow deflecting body 14 is positioned at the retracted position, the restricting plates 24E contact the retraction restricting surfaces 39B. Due thereto, further rotation of the airflow deflecting body 14 in the retracting direction B from the retracted position is prevented. Note that the time when the restricting plates 24E contact the extension restricting surfaces 39A due to rotation of the airflow deflecting body 14 in the extending direction A is defined as a first time. Further, the time when the restricting plates 24E contact the retraction restricting surfaces 39B due to rotation of the airflow deflecting body 14 in the retracting direction B is defined as a second time.

A clutch 52, which is substantially shaped as a cylindrical tube, is made of metal and serves as a transmitting member, is provided at the vehicle transverse direction inner side of the output gear 50. The stand 18 is coaxially fit together with the interior of the clutch 52, and the clutch 52 is supported at the stand 18. The clutch 52 can rotate integrally with the stand 18, and can move in the axial direction (the vehicle transverse direction) with respect to the stand 18. The clutch 52 is engaged with the output gear 50, and rotates integrally with the output gear 50.

A coil spring 54, which is made of metal and serves as an urging member, is provided at the vehicle transverse direction inner side of the clutch 52. The stand 18 is coaxially inserted within the coil spring 54. A push nut 56 (refer to FIG. 8B), which is substantially shaped as an annular disk, is made of metal and serves as an anchoring member, is fit together with and fixed to a vicinity of the vehicle transverse direction inner side end portion of the stand 18. The coil spring 54 bridges between the push nut 56 and the clutch 52. The coil spring 54 is compressed in the axial direction. The coil spring 54 urges the clutch 52 and the output gear 50 toward the vehicle transverse direction outer side, and limits cancelation of the engagement of the output gear 50 and the clutch 52.

Figure 11:
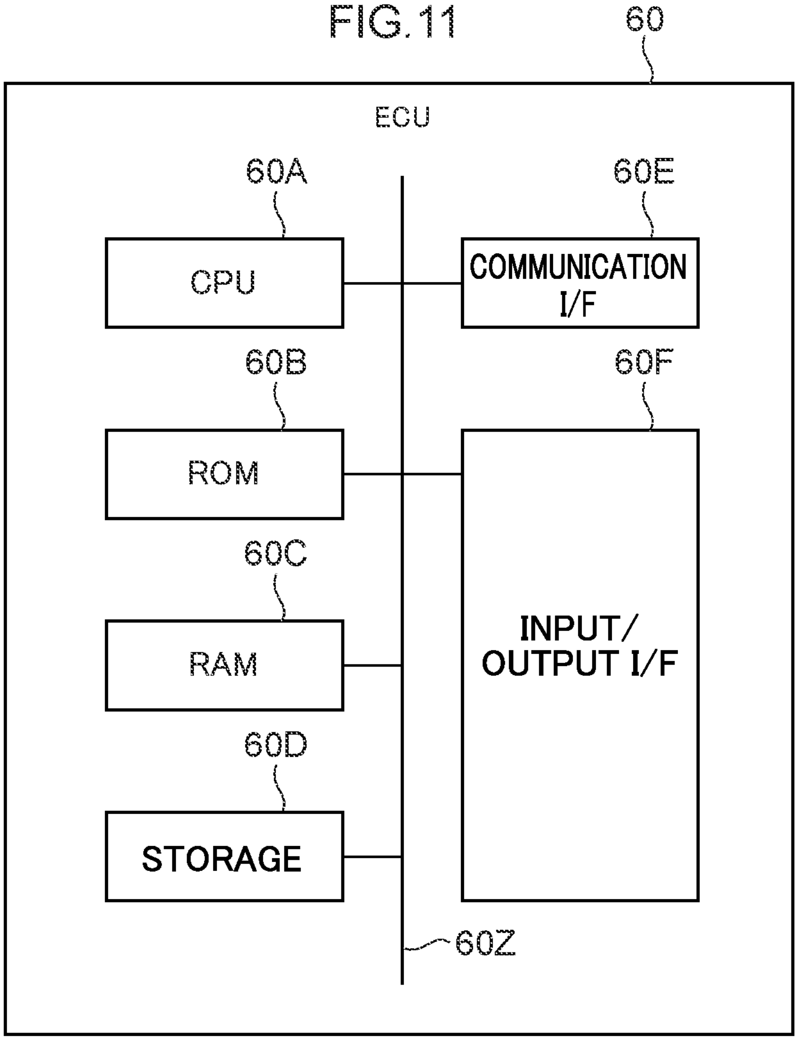
FIG. 11 is a schematic block drawing of an ECU of the vehicle illustrated in FIG. 1.

As illustrated in FIG. 11, the airflow deflector 10 has, as a hardware structure, the ECU (Electronic Control Unit) 60 that is used exclusively for the airflow deflector 10. As illustrated in FIG. 11, the ECU 60 is structured to include a CPU (Central Processing Unit) 60A, a ROM (Read Only Memory) 60B, a RAM (Random Access Memory) 60C, a storage 60D, a communication I/F 60E and an input/output I/F 60F. The CPU 60A, the ROM 60B, the RAM 60C, the storage 60D, the communication I/F 60E and the input/output I/F 60F are connected so as to be able to communicate with one another via internal bus 60Z.

The CPU 60A is a central computing processing unit, and executes various programs and controls respective sections. The CPU 60A reads-out programs from the ROM 60B or the storage 60D, and executes the programs by using the RAM 60C as a workspace. In accordance with programs recorded in the ROM 60B or the storage 60D, the CPU 60A carries out control of the respective structures, and various types of computing processings. The CPU 60A can acquire information relating to the time from a timer.

The ROM 60B stores various programs and various data. The RAM 60C temporarily stores programs and data as a workspace. The storage 60D is structured by a storage device such as an HDD (Hard Disk Drive), an SSD (Solid State Drive) or the like, and stores various programs and various data.

The communication I/F 60E is an interface for connecting with ECUs (not illustrated) which are other than the ECU 60, via an external bus (not illustrated). This interface uses communication standards in accordance with CAN protocol for example.

The input/output I/F 60F is an interface for communicating with various devices. For example, the magnetic sensor 38 and the motor 42 are included among these devices.

Figure 12:
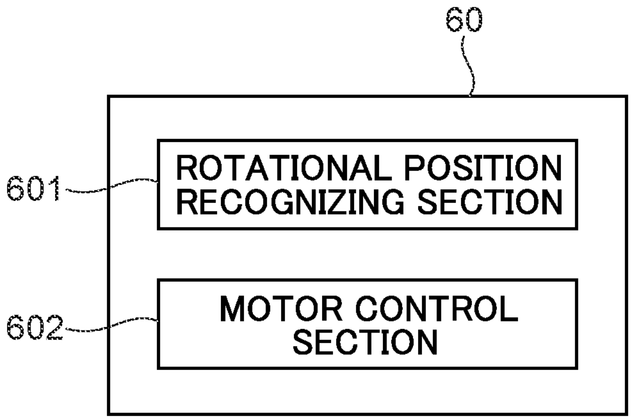
FIG. 12 is a functional block drawing of the ECU illustrated in FIG. 11.

An example of the functional structures of the ECU 60 is illustrated in FIG. 12 in a block drawing. The ECU 60 has, as the functional structures thereof, a rotational position recognizing section 601 and a motor control section (driving section control section) 602. The rotational position recognizing section 601 and the motor control section 602 are realized due to the CPU 60A reading-out and executing a program that is stored in the ROM 60B.

The rotational position recognizing section 601 recognizes the rotational position of the stand 18 on the basis of the detection value of the magnetic sensor 38. Namely, on the basis of the detection value of the magnetic sensor 38, the rotational position recognizing section 601 recognizes what position between the retracted position and the extended position, the airflow deflecting body 14 is at.

Moreover, the rotational position recognizing section 601 judges that the airflow deflecting body 14 has stopped rotating at the extended position, when the rotational position recognizing section 601 judges, on the basis of the detection value of the magnetic sensor 38, that there has been no change in the rotational position of the airflow deflecting body 14 (the stand 18) in a first predetermined range that includes the extended position, throughout a threshold time period. The "there is no change in the rotational position of the airflow deflecting body 14 (the stand 18)" in the present specification means that there is absolutely no change in the rotational position of the airflow deflecting body 14, or that the airflow deflecting body 14 continues to be within a predetermined, extremely small range. Note that this extremely small range is more narrow than the first predetermined range and a second predetermined range that is described hereinafter. Further, the rotational position recognizing section 601 judges that the airflow deflecting body 14 has stopped rotating at the retracted position, when the rotational position recognizing section 601 judges, on the basis of the detection value of the magnetic sensor 38, that there has been no change in the rotational position of the airflow deflecting body 14 in the second predetermined range that includes the retracted position, throughout a threshold time period. For example, in a case in which the retracted position is 0°, a range of −0.5°~+0.5° can be set as the second predetermined range. Further, in a case in which the extended position is 45.0°, a range of +44.5°~+45.5° can be set as the first predetermined range. Moreover, when the rotational position recognizing section 601 judges that the airflow deflecting body 14 is stopped at the extended position (the first predetermined range) or at the retracted position (the second predetermined range), the rotational position recognizing section 601 judges that the situation is normal. Further, information relating to the threshold time period is recorded in the ROM 60B. The threshold time period is, for example, 0.5 seconds.

Moreover, when, on the basis of the detection value of the magnetic sensor 38, the rotational position recognizing section 601 judges that there has been no change in the rotational position of the airflow deflecting body 14 throughout the threshold time period in a region of rotation that is different than the first predetermined range and the second predetermined range, the rotational position recognizing section 601 judges that the airflow deflecting body 14 has stopped rotating at a position that is different than the first predetermined range and the second predetermined range. Moreover, when the rotational position recognizing section 601 judges that the airflow deflecting body 14 is stopped at a position that is different than the first predetermined range and the second predetermined range, the rotational position recognizing section 601 judges that the situation is abnormal.

When the vehicle speed, which is detected by a vehicle speed sensor (not illustrated) provided at the vehicle 12, changes from less than a threshold value to greater than or equal to the threshold value, the motor control section 602 transmits a forward rotation signal to the motor 42. Due thereto, the output shaft 42B of the motor 42 rotates forward, and the airflow deflecting body 14 rotates in the extending direction A. Moreover, when the vehicle speed detected by the vehicle speed sensor changes from greater than or equal to the threshold value to less than the threshold value, the motor control section 602 transmits a reverse rotation signal to the motor 42. Due thereto, the output shaft 42B of the motor 42 rotates reversely, and the airflow deflecting body 14 rotates in the retracting direction B.

Moreover, during the transmitting of the forward rotation signal, when the rotational position recognizing section 601 judges on the basis of the detection value of the magnetic sensor 38 that the airflow deflecting body 14 has arrived at the first predetermined range, the motor control section 602 continues to transmit the forward rotation signal throughout the above-described threshold time period. In other words, the motor control section 602 continues transmitting the forward rotation signal throughout the threshold time period from the aforementioned first time. Further, during the transmitting of the reverse rotation signal, when the rotational position recognizing section 601 judges on the basis of the detection value of the magnetic sensor 38 that the airflow deflecting body 14 has arrived at the second predetermined range, the motor control section 602 continues transmitting the reverse rotation signal throughout the threshold time period. In other words, the motor control section 602 continues to transmit the reverse rotation signal throughout the threshold time period from the aforementioned second time.

Operation of the first embodiment is described next.

Figure 13:
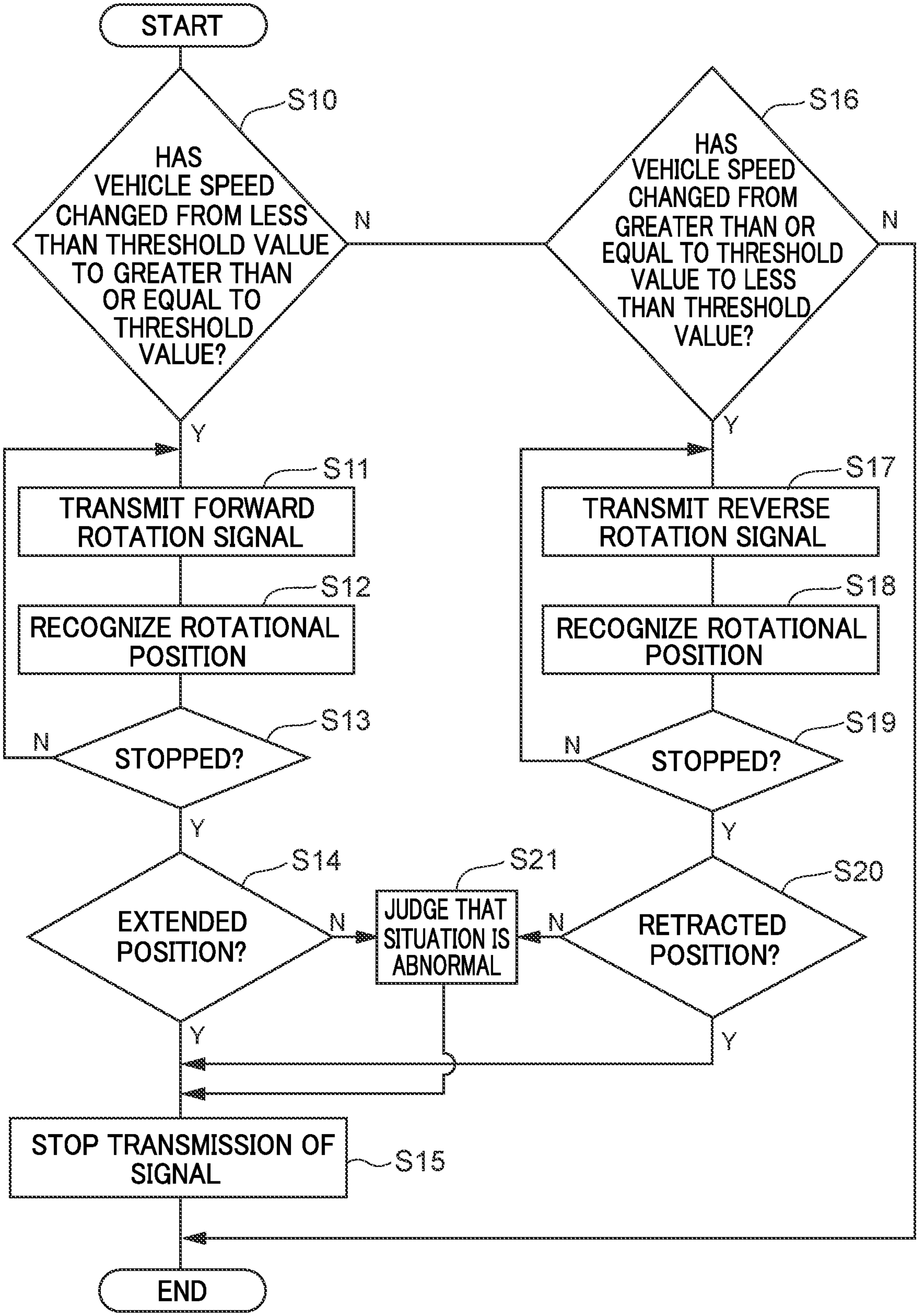
FIG. 13 is a flowchart illustrating processings carried out by a CPU of the ECU.

Each time that a predetermined time period elapses, the CPU 60A repeatedly executes the processing of the flowchart illustrated in FIG. 13.

In step S10 (hereinafter, the word "step" will be omitted), the CPU 60A judges whether or not the vehicle speed has changed from less than a threshold value to greater than or equal to the threshold value.

If the judgement in S10 is Yes, the CPU 60A moves on to S11 and transmits a forward rotation signal to the motor 42. Due thereto, the output shaft 42B, the first-stage worm 44, the first-stage gear 48 and the output worm 46 rotate, and the output gear 50, the clutch 52, the stand 18 and the airflow deflecting body 14 rotate in the extending direction A.

When the processing of S11 is finished, the CPU 60A moves on to S12 and, on the basis of the detection value of the magnetic sensor 38, recognizes the rotational position of the stand 18.

When the processing of S12 is finished, the CPU 60A moves on to S13 and judges whether or not the stand 18 and the airflow deflecting body 14 have stopped the rotating operation. Namely, on the basis of the detection value of the magnetic sensor 38, the CPU 60A judges whether the rotational position of the stand 18 has not changed throughout the threshold time period.

If the judgment of S13 is Yes, the CPU 60A moves on to S14 and, on the basis of the detection value of the magnetic sensor 38, judges whether or not the airflow deflecting body 14 is at the extended position. In other words, the CPU 60A judges whether or not the restricting plates 24E have contacted the extension restricting surfaces 39A.

If the judgement in S14 is Yes, the CPU 60A moves on to S15 and judges that the situation is normal, and, when the threshold time period from the first time at which the restricting plates 24E contacted the extension restricting surfaces 39A elapses, stops the transmitting of the forward rotation signal to the motor 42. In other words, in this case, the forward rotation signal continues to be transmitted to the motor 42 from the first time until the threshold time period elapses. Due thereto, backlash between the first-stage worm 44 and the first-stage gear 48, and backlash between the first-stage gear 48 and the output worm 46, are eliminated.

Moreover, in S15, when the motor 42 stops rotating, because the restricting plates 24E are contacting the extension restricting surfaces 39A, the airflow deflecting body 14 is prevented from rotating further in the extending direction A from the extended position. Moreover, backlash between the first-stage worm 44 and the first-stage gear 48, and backlash between the first-stage gear 48 and the output worm 46, are eliminated. Therefore, rotation of the airflow deflecting body 14 in the retracting direction B is restricted. Thus, the airflow deflecting body 14 is self-locked at the extended position. In this way, when the airflow deflecting body 14 is positioned at the extended position that is a position directly in front of the front wheel 12B of the vehicle 12 at the lower side of the vehicle body 12A, the traveling wind (flow of air) of the vehicle 12 reaching the front wheel 12B is suppressed by the airflow deflecting body 14. Namely, due to the working of the airflow deflecting body 14, the traveling wind is made to flow toward the lower side of the front wheel 12B. Due thereto, an increase in the air pressure at the vehicle front side of the front wheel 12B is suppressed, and air resistance and lift of the vehicle 12 are suppressed.

On the other hand, if the judgment in S10 is No, the CPU 60A moves on to S16 and judges whether or not the vehicle speed has changed from greater than or equal to the threshold value to less than the threshold value.

If the judgment in S16 is Yes, the CPU 60A moves on to S17 and transmits a reverse rotation signal to the motor 42. Due thereto, the airflow deflecting body 14 rotates in the retracting direction B.

When the processing of S17 is finished, the CPU 60A moves on to S18 and, on the basis of the detection value of the magnetic sensor 38, recognizes the rotational position of the stand 18.

When the processing of S18 is finished, the CPU 60A moves on to S19 and judges whether or not the stand 18 and the airflow deflecting body 14 have stopped the rotating operation.

If the judgment in S19 is Yes, the CPU 60A moves on to S20 and, on the basis of the detection value of the magnetic sensor 38, judges whether or not the airflow deflecting body 14 is at the retracted position. In other words, the CPU 60A judges whether or not the restricting plates 24E have contacted the retraction restricting surfaces 39B.

If the judgement in S20 is Yes, the CPU 60A moves on to S15 and judges that the situation is normal, and, when the threshold time period from the second time at which the restricting plates 24E contacted the retraction restricting surfaces 39B elapses, stops the transmitting of the reverse rotation signal to the motor 42. In other words, in this case, the reverse rotation signal continues to be transmitted to the motor 42 from the second time until the threshold time period elapses. Due thereto, backlash between the first-stage worm 44 and the first-stage gear 48, and backlash between the first-stage gear 48 and the output worm 46, are eliminated.

Moreover, in S15, when the motor 42 stops rotating, because the restricting plates 24E are contacting the retraction restricting surfaces 39B, the airflow deflecting body 14 is prevented from rotating further in the retracting direction B from the retracted position. Moreover, backlash between the first-stage worm 44 and the first-stage gear 48, and backlash between the first-stage gear 48 and the output worm 46, are eliminated. Therefore, rotation of the airflow deflecting body 14 in the extending direction A is restricted. Thus, the airflow deflecting body 14 is self-locked at the retracted position.

If the judgement in S14 or S20 is No, the CPU 60A moves on to S21. If the airflow deflecting body 14 is stopped at a position that is different than the retracted position or the extended position, the CPU 60A moves on to S21. Therefore, in this case, in S21, the CPU 60A judges that the situation is abnormal. For example, in a case in which the airflow deflecting body 14 is stopped at a position that is different than the retracted position or the extended position due to trouble with the motor 42, the CPU 60A judges that the situation is abnormal. At this time, the CPU 60A may display, on a display (not illustrated) that is provided at the interior of the vehicle 12, text that expresses that the airflow deflecting body 14 is stopped at a position that is different than the retracted position and the extended position.

When the processing of S21 is finished, the CPU 60A moves on to S15 and stops the transmitting of a signal to the motor 42.

If the judgment in S16 is No or when the processing of S15 is finished, the CPU 60A ends the processing of the flowchart of FIG. 13 for the time being.

As described above, the airflow deflector 10 of the first embodiment detects the rotational position of the stand 18 and the airflow deflecting body 14 by using the magnet 34 and the magnetic sensor 38. Therefore, the airflow deflector 10 can detect the rotational position of the airflow deflecting body 14 no matter what position the airflow deflecting body 14 is at. Moreover, if the rotational position of the stand 18 and the airflow deflecting body 14 does not change throughout the threshold time period, it is judged that the airflow deflecting body 14 has stopped rotating. Moreover, the airflow deflector 10 can detect the rotational position of the airflow deflecting body 14 without taking into consideration the state of the driving section (the motor 42, the first-stage worm 44, the output worm 46, the first-stage gear 48). Therefore, the airflow deflector 10 can detect the rotational position of the airflow deflecting body 14 even in a case in which the driving section has broken down.

Moreover, the airflow deflector 10 judges that the airflow deflecting body 14 has stopped rotating at the extended position, when it is judged that there is no change in the rotational position of the airflow deflecting body 14, which is detected by the magnetic sensor 38, in the first predetermined range that includes the extended position and throughout the threshold time period. Moreover, the airflow deflector 10 judges that the airflow deflecting body 14 has stopped rotating at the retracted position, when it is judged that there is no change in the rotational position of the airflow deflecting body 14, which is detected by the magnetic sensor 38, in the second predetermined range that includes the retracted position and throughout the threshold time period. Therefore, the airflow deflector 10 can accurately judge whether or not the airflow deflecting body 14 is at the extended position or the retracted position.

Moreover, on the basis of the detection value of the magnetic sensor 38, the airflow deflector 10 judges that the situation is normal when judging that the airflow deflecting body 14 has stopped rotating in the first predetermined range or when judging that the airflow deflecting body 14 has stopped rotating in the second predetermined range. Moreover, on the basis of the detection value of the magnetic sensor 38, the airflow deflector 10 judges that the situation is abnormal when judging that the airflow deflecting body 14 has stopped rotating at a position that is different than the first predetermined range and the second predetermined range. Therefore, by using the one set of the magnet 34 and the magnetic sensor 38, the airflow deflector 10 can execute a judgement as to whether or not the airflow deflecting body 14 is stopped, and a judgment as to whether or not the position at which rotation of the airflow deflecting body 14 is stopped is included in the first predetermined range or the second predetermined range.

Moreover, the airflow deflector 10 includes the first stopper mechanism (the restricting plates 24E and the extension restricting surfaces 39A) that mechanically restricts rotation of the airflow deflecting body 14 in the extending direction A from the extended position. Further, the airflow deflector 10 includes the second stopper mechanism (the restricting plates 24E and the retraction restricting surfaces 39B) that mechanically restricts rotation of the airflow deflecting body 14 in the retracting direction B from the retracted position. Therefore, the airflow deflector 10 can reliably prevent the airflow deflecting body 14 from rotating in the extending direction A from the extended position, and from rotating in the retracting direction B from the retracted position.

Moreover, the airflow deflector 10 can self-lock the airflow deflecting body 14 at the extended position or the retracted position.

Moreover, at the airflow deflector 10, the rotational position of the airflow deflecting body 14 is detected by utilizing the fact that the magnetic sensor 38 detects the direction of the magnetic field generated by the magnet 34 that is fixed to the fixing hole 20 of the stand 18 so as to be coaxial with the stand 18. Therefore, no matter what position the rotational position of the stand 18 and the airflow deflecting body 14 is at, the distance between the magnet 34 and the magnetic sensor 38 substantially does not change. Therefore, the magnetic sensor 38 of the first embodiment can reliably detect the magnetic field generated by the magnet 34. On the other hand, in a case in which the magnet 34 is provided at the airflow deflecting body 14, the distance between the magnet 34 and the magnetic sensor 38 changes as the rotational position of the stand 18 and the airflow deflecting body 14 changes. Namely, the airflow deflector 10 of the first embodiment can detect the rotational position of the airflow deflecting body 14 with high accuracy, as compared with a case in which the magnet 34 is provided at the airflow deflecting body 14.

A second embodiment of the present disclosure is described next with reference to FIG. 14. Note that structures that are the same as those of the first embodiment are denoted by the same reference numerals, and detailed description thereof is omitted.

The airflow deflector 10 of the second embodiment does not include the first stopper mechanism (the restricting plates 24E and the extension restricting surfaces 39A) and the second stopper mechanism (the restricting plates 24E and the retraction restricting surfaces 39B).

Further, the motor control section 602 immediately stops transmitting the forward rotation signal when, during the transmission of the forward rotation signal, the rotational position recognizing section 601 judges that the airflow deflecting body 14 has arrived at the first predetermined range on the basis of the detection value of the magnetic sensor 38. Moreover, the motor control section 602 immediately stops transmitting the reverse rotation signal when, during the transmission of the reverse rotation signal, the rotational position recognizing section 601 judges that the airflow deflecting body 14 has arrived at the second predetermined range on the basis of the detection value of the magnetic sensor 38.

The rotational position recognizing section 601 judges that the airflow deflecting body 14 has stopped rotating at the extended position, when the rotational position recognizing section 601 judges, on the basis of the detection value of the magnetic sensor 38, that there has been no change in the rotational position of the airflow deflecting body 14 (the stand 18) in the first predetermined range that includes the extended position, throughout the threshold time period. Namely, the rotational position recognizing section 601 continues to recognize the rotational position of the airflow deflecting body 14 throughout the threshold time period from the time when the motor control section 602 stops transmitting the forward rotation signal, and, when the threshold time period elapses, if there is no change in the rotational position of the airflow deflecting body 14, the rotational position recognizing section 601 judges that the airflow deflecting body 14 has stopped rotating at the extended position. Further, the rotational position recognizing section 601 judges that the airflow deflecting body 14 has stopped rotating at the retracted position, when the rotational position recognizing section 601 judges, on the basis of the detection value of the magnetic sensor 38, that there has been no change in the rotational position of the airflow deflecting body 14 in the second predetermined range that includes the retracted position, throughout the threshold time period. Namely, the rotational position recognizing section 601 continues to recognize the rotational position of the airflow deflecting body 14 throughout the threshold time period from the time when the motor control section 602 stops transmitting the reverse rotation signal, and, when the threshold time period elapses, if there is no change in the rotational position of the airflow deflecting body 14, the rotational position recognizing section 601 judges that the airflow deflecting body 14 has stopped rotating at the retracted position. Moreover, in the second embodiment as well, the rotational position recognizing section 601 judges that the situation is normal when judging that the airflow deflecting body 14 is stopped at the extended position (the first predetermined range) or at the retracted position (the second predetermined range).

Moreover, in the second embodiment as well, the rotational position recognizing section 601 judges that the airflow deflecting body 14 has stopped rotating at a position that is different than the first predetermined range and the second predetermined range, when the rotational position recognizing section 601 judges, on the basis of the detection value of the magnetic sensor 38, that there has been no change in the rotational position of the airflow deflecting body 14 throughout the threshold time period in a region of rotation that is different than the first predetermined range and the second predetermined range. Moreover, in the second embodiment as well, the rotational position recognizing section 601 judges that the situation is abnormal when judging that the airflow deflecting body 14 is stopped at a position that is different than the first predetermined range and the second predetermined range.

Figure 14:
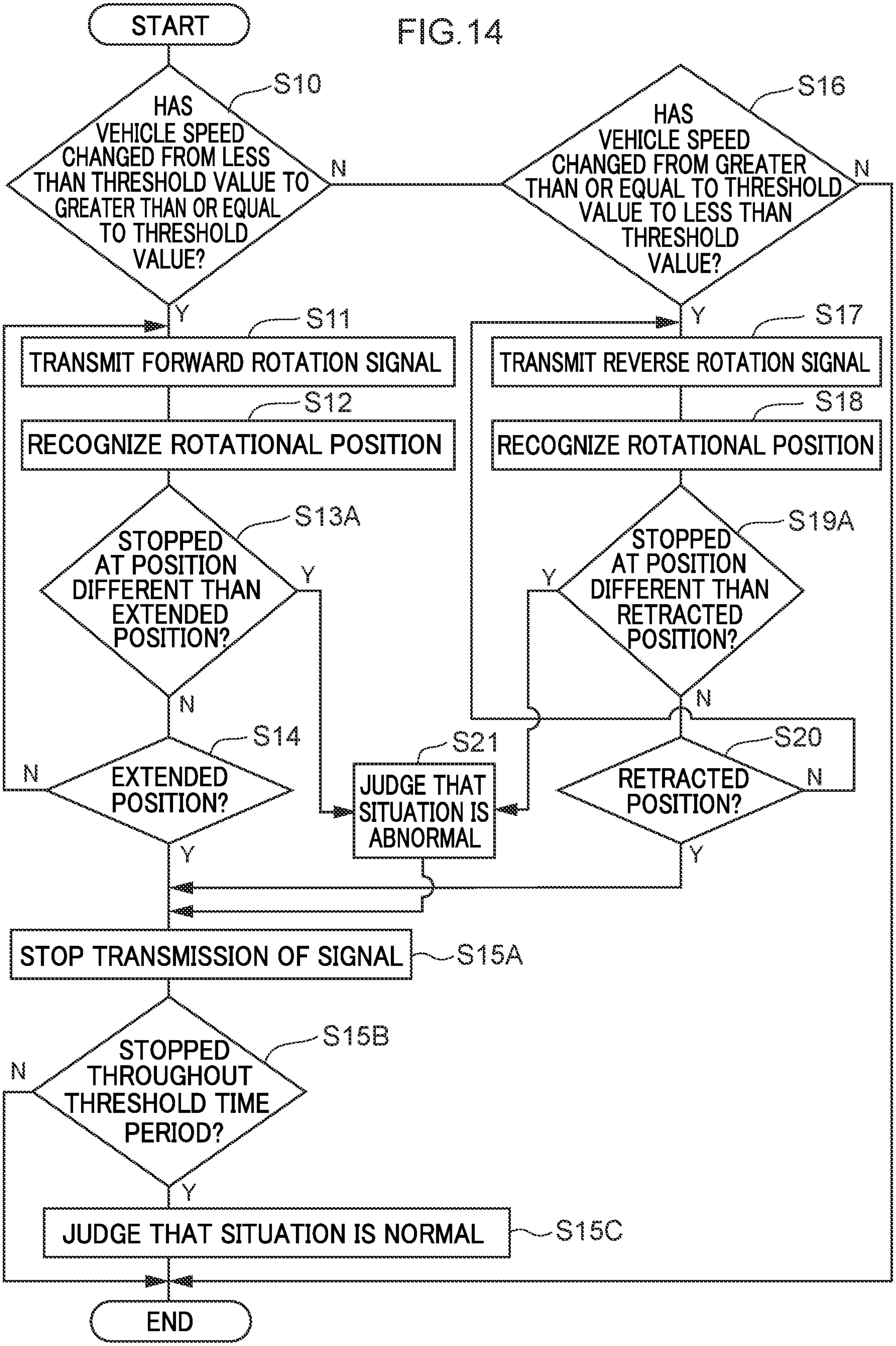
FIG. 14 is a flowchart illustrating processings carried out by the CPU of the ECU in a second embodiment of the present disclosure.

Each time that a predetermined time period elapses, the CPU 60A of the second embodiment repeatedly executes the processing of the flowchart illustrated in FIG. 14. The processings of S10 through S12 are the same as in the first embodiment.

When the processing of S12 is finished, the CPU 60A moves on to S13A and judges, on the basis of the detection value of the magnetic sensor 38, whether or not the airflow deflecting body 14 has stopped the rotating operation at a position that is different than the first predetermined range (the extended position). Namely, on the basis of the detection value of the magnetic sensor 38, the CPU 60A judges whether there has been no change in the rotational position of the airflow deflecting body 14 throughout the threshold time period in a region of rotation that is different than the first predetermined range.

If the judgment in S13A is Yes, the CPU 60A moves on to S21 and judges that the situation is abnormal.

On the other hand, if the judgement in S13A is No, the CPU 60A moves on to S14.

If the judgment in S14 is Yes, the CPU 60A moves on to S15A and immediately stops transmission of the forward rotation signal to the motor 42.

When the processing of S15A is finished, the CPU 60A moves on to S15B and, on the basis of the detection value of the magnetic sensor 38, judges whether or not the airflow deflecting body 14 has stopped in the first predetermined range throughout the threshold time period.

If the judgment in S15B is Yes, the CPU 60A moves on to S15C, and judges that the situation is normal.

On the other hand, if the judgment in S10 is No, the CPU 60A executes the processings of S16 through S18.

When the processing of S18 is finished, the CPU 60A moves on to S19A and, on the basis of the detection value of the magnetic sensor 38, judges whether or not the airflow deflecting body 14 has stopped the rotating operation at a position that is different than the second predetermined range (the retracted position). Namely, on the basis of the detection value of the magnetic sensor 38, the CPU 60A judges whether there has been no change in the rotational position of the airflow deflecting body 14 throughout the threshold time period in a region of rotation that is different than the second predetermined range.

If the judgment in S19A is Yes, the CPU 60A moves on to S21 and judges that the situation is abnormal.

On the other hand, if the judgement in S19A is No, the CPU 60A moves on to S20.

If the judgment in S20 is Yes, the CPU 60A moves on to S15A and immediately stops transmission of the reverse rotation signal to the motor 42.

When the processing of S15A is finished, the CPU 60A moves on to S15B and, on the basis of the detection value of the magnetic sensor 38, judges whether or not the airflow deflecting body 14 has stopped in the second predetermined range throughout the threshold time period.

When the judgement in S15B is Yes, the CPU 60A moves on to S15C and judges that the situation is normal.

If the judgment in S15B or in S16 is No, or when the processing of S15C is finished, the CPU 60A ends the processing of the flowchart of FIG. 14 for the time being.

As described above, the airflow deflector 10 of the second embodiment as well detects the rotational position of the stand 18 and the airflow deflecting body 14 by using the magnet 34 and the magnetic sensor 38. Therefore, the airflow deflector 10 can detect the rotational position of the airflow deflecting body 14 no matter what position the airflow deflecting body 14 is at. Moreover, in the airflow deflector 10 of the second embodiment as well, if the rotational position of the airflow deflecting body 14 does not change throughout the threshold time period, it is judged that the airflow deflecting body 14 has stopped rotating. Moreover, the airflow deflector 10 of the second embodiment as well detects the rotational position of the airflow deflecting body 14 without taking into consideration the state of the driving section (the motor 42, the first-stage worm 44, the output worm 46, the first-stage gear 48). Therefore, the airflow deflector 10 of the second embodiment can detect the rotational position of the airflow deflecting body 14 even in a case in which there is trouble with the driving section.

Although the airflow deflector 10 relating to embodiments has been described above, the design of the airflow deflector 10 can be changed appropriately within a scope that does not depart from the gist of the present disclosure.

For example, the magnetic sensor 38 may be provided at the stand 18, and the magnet 34 may be provided at the circuit board 36 or the cover 32.

The detecting device (detected portion, detecting portion) may include a structure that is different than the magnet 34 and the magnetic sensor 38. For example, the detecting device may include an optical detecting device having a light-emitting portion that emits light and a light-receiving portion that receives the light emitted by the light-emitting portion, and a transmission plate positioned between the light-emitting portion and the light-receiving portion and having plural through-holes that are lined-up in the peripheral direction. For example, the optical detecting device is provided at the circuit board 36, and the transmission plate is fixed to the stand 18. The optical detecting device is connected to the ECU 60. By structuring the detecting device in this way, when the stand 18 rotates, the light emitted by the light-emitting portion passes through the through-holes that are formed intermittently in the transmission plate and is received by the light-receiving portion. On the basis of the number of times that the light-receiving portion receives light, the ECU 60 (the rotational position recognizing section 601) detects the rotational position of the stand 18. Note that the transmission plate may be fixed to the circuit board 36, and the optical detecting device may be provided at the stand 18.

The ECU 60 does not have to be an ECU that is used exclusively for the airflow deflector 10, and may be the ECU that controls the airflow deflector 10 and devices other than the airflow deflector 10.

What is claimed is:

1. An airflow deflector comprising:

an airflow deflecting body that is supported at a vehicle body of a vehicle so as to be rotatable between an extended position at a lower side of the vehicle body of the vehicle and a retracted position at a vehicle body side;

a driving section that generates driving force for rotating the airflow deflecting body;

a detecting device that detects a rotational position of the airflow deflecting body irrespective of operation of the driving section; and a rotational position recognizing section that, in a case of judging that the rotational position detected by the detecting device has not changed throughout a threshold time period, judges that the airflow deflecting body has stopped rotating.

2. The airflow deflector of claim 1, wherein:

based on a detection value of the detecting device, the rotational position recognizing section judges that a situation is normal in a case of judging that the airflow deflecting body has stopped rotating in a first predetermined range that includes the extended position or in a case of judging that the airflow deflecting body has stopped rotating in a second predetermined range that includes the retracted position, and based on the detection value of the detecting device, the rotational position recognizing section judges that a situation is abnormal in a case of judging that the airflow deflecting body has stopped rotating at a position that is different from the first predetermined range and the second predetermined range.

3. The airflow deflector of claim 1, comprising:

a first stopper mechanism that mechanically restricts rotation of the airflow deflecting body from the extended position in an extending direction that is a direction at a side opposite the retracted position; and a second stopper mechanism that mechanically restricts rotation of the airflow deflecting body from the retracted position in a retracting direction that is a direction at a side opposite the extended position.

4. The airflow deflector of claim 3, comprising:

a driving section control section that controls the driving section; and a worm, and a worm wheel that is meshed with the worm, which transmit driving force generated by the driving section to the airflow deflecting body, wherein the driving section control section controls the driving section to generate driving force for rotating the airflow deflecting body in the extending direction throughout the threshold time period after the first stopper mechanism restricts rotation of the airflow deflecting body in the extending direction, and wherein the driving section control section controls the driving section to generate driving force for rotating the airflow deflecting body in the retracting direction throughout the threshold time period after the second stopper mechanism restricts rotation of the airflow deflecting body in the retracting direction.

5. The airflow deflector of claim 1, comprising a rotation shaft that is a center of rotation of the airflow deflecting body, wherein the detecting device includes:

a detected portion, and a detecting portion that detects a position of the detected portion, and wherein one of the detected portion or the detecting portion is provided at the rotation shaft, coaxially with the rotation shaft.

* * * * *